United States Patent Office 3,084,164
Patented Apr. 2, 1963

3,084,164
LYSERGIC ACID HALIDE HYDROHALIDES
Albert Frey, Riehen, Switzerland, assignor to Sandoz Ltd. (also known as Sandoz A.G.), Basel, Switzerland, a Swiss firm
No Drawing. Filed Oct. 2, 1961, Ser. No. 141,967
Claims priority, application Switzerland Oct. 4, 1960
6 Claims. (Cl. 260—285.5)

The present invention relates to halides of the lysergic and dihydrolysergic acid series and a process for their production.

The new compounds correspond to the general Formula I

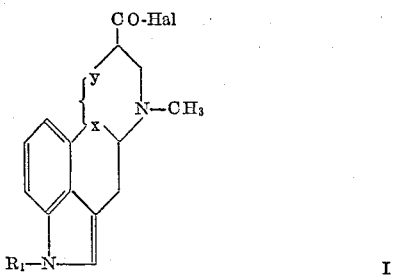

wherein $R_1$ signifies a member selected from the group consisting of hydrogen, an alkyl containing from 1 to 4 carbon atoms inclusive and $\widetilde{x\ y}$ signifies a member selected from the group consisting of —CH=C< and

—CH$_2$—C< groupings and Hal signifies a member selected from the group consisting of chlorine, bromine, iodine, and their acid addition salts. The preferred compounds I are those wherein Hal signifies a member selected from the group consisting of chlorine.

The present invention also provides a process for the production of compounds I, characterised in that a lysergic or dihydrolysergic acid derivative of general Formula II

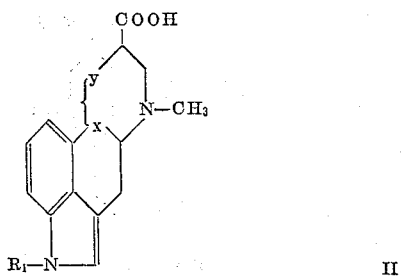

wherein $R_1$ and $\widetilde{x\ y}$ have the above significance or represent an alkali metal salt thereof, is converted to the corresponding acid halide with a phosphorus halide, a phosphorus oxyhalide, a thionyl halide. It should be noted that the compounds I are obtained in the form of their acid addition salts.

Preferred phosphorus halides for use in the process of the invention are phosphorus pentachloride and trichloride. The preferred phosphorus oxyhalide is phosphorus oxychloride. The preferred thionyl halide is thionyl chloride.

In addition to the above preferred phosphorus halides for use in the process of the invention, phosphorus pentabromide and phosphorus triiodide may also be used.

The conversion of compounds II to the corresponding acid halide is preferably effected in a solvent, e.g. acetonitrile, carbon disulphide, chloroform, dimethyl formamide; it is to be noted that the starting materials are difficultly soluble and hence they only partly dissolve in these solvents; they are mainly suspended in them. It is also mentioned that, although phosphorus oxychloride effects the conversion of alkali metal salts of the starting materials to the end product, it acts as a solvent when the starting materials are used as free acids.

The process in accordance with the present invention may, for example, be effected as follows: Lysergic or dihydrolysergic acid, or a dry alkali metal salt thereof, is suspended in a solvent, e.g. carbon disulphide, acetonitrile, dimethyl formamide, and an equivalent quantity or an excess of a phosphorus halide added, the reaction being effected at a temperature of from 0 to 100°. In the case of a liquid acid halide, e.g. phosphorus trichloride or phosphorus tribromide, an excess of the acid halide may be used so that no solvent is required. Should an alkali metal salt be used instead of the acid, then boiling in phosphorus oxychloride gives rise to the required lysergic acid chloride I.

The lysergic acid halide I may be isolated by evaporating the solvent in a vacuum or by dilution of the reaction mixture with petroleum ether or hexane, the compound I precipitating as a filterable hydrogen halide which is generally a light grey crystalline powder and may be hygroscopic.

The halogen atom of compounds I is very reactive and may be replaced by many organic radicals so that compounds I are valuable intermediates for the production of pharmaceuticals.

Compounds I may be used as starting materials in the production of ergot alkaloids of the peptide type. Ergotamine, 9,10-dihydro-ergotamine may, for example, be synthesised by reacting lysergic acid chloride hydrochloride, a 9,10-dihydrolysergic acid chloride hydrochloride respectively with amino-cyclol hydrochloride of Formula III,

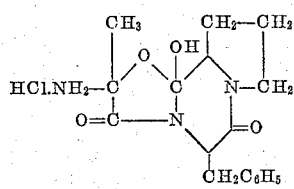

Physiologically active amides of the lysergic and dihydrolysergic acid series (e.g. ergotamine, 9,10-dihydroergotamine, lysergic acid diethylamide, lysergic acid butanolamide, ergonovine) may furthermore be obtained by conversion of the compounds I with amines. The compounds I generally provide the best method of obtaining these known, useful physiologically active amides, since the method using compounds I as intermediates provides optimum yields and simplifies greatly the procedure.

Hitherto it had been thought that classical methods of producing acid halides could not be applied to compounds II, probably because of their sensitivity (see W. L. Garbrecht, "Synthesis of Amides of Lysergic Acid," J. Org. Chem., vol. 24, pp. 368–372, at page 368, where it is stated that "The classical methods for preparing amides by acylation of amines with esters or acid chlorides fail when applied to lysergic acid."), and it is therefore highly surprising that such extremely potent acids as the phosphorus halides, oxyhalides and thionyl halides do not cause any appreciable change in the lysergic acid nucleus.

It has, however, now been surprisingly found that lysergic and dihydrolysergic acid halides, which may be substituted in the 1-position, may, under various conditions, be produced and even isolated and stored as salts.

The terms "lysergic acid" and dihydrolysergic acid," as used in this specification, include all possible stereoisomers of the lysergic acid and dihydrolysergic acid series.

In the following non-limitative examples, all temperatures are given in degrees centigrade. The melting points are uncorrected.

*Example 1.—D-Lysergic Acid Chloride Hydrochloride*

The D-lysergic acid chloride hydrochloride is produced as follows: 536 mg. of D-lysergic acid are finely suspended in 10 cc. of freshly distilled phosphorus oxychloride, and 416 mg. of finely pulverised freshly sublimated phosphorus pentachloride are added whilst stirring. The reaction mixture is then shaken for 2 minutes at room temperature, heated to 90° and kept at this temperature for 2 minutes. The phosphorus oxychloride is then evaporated in a water jet vacuum and the remaining grey powder recrystallised twice from hexane. The D-lysergic acid chloride hydrochloride resulting as a light yellow crystalline powder has a melting point of 310–315° in an evacuated tube.

*Example 2.—D-Lysergic Acid Chloride Hydrochloride*

268 mg. of D-lysergic acid are suspended in 3 cc. of phosphorus oxychloride, 120 mg. of thionyl chloride are added and the mixture heated to 90° for 3 minutes. Evaporation of the light fratcions in a vacuum results in the acid chloride remaining as a green-grey powder.

*Example 3.—D-Lysergic Acid Chloride Hydrochloride*

268 mg. of D-lysergic acid are converted with phosphorus pentachloride in phosphorus oxychloride in a manner analogous to that described in Example 2. However, instead of evaporating the phosphorus oxychloride to dryness in a vacuum, the reaction mixture is diluted with a five-fold quantity of n-hexane, the D-lysergic acid chloride hydrochloride precipitating as a grey powder. The mixture is filtered and the filter cake washed well with n-hexane, so that the remaining residues of phosphorus oxychloride, which is easily soluble in hexane, are removed. The acid chloride hydrochloride is dried in a high vacuum and may be stored in the dark.

*Example 4.—Di-Dihydrolysergic Acid Chloride Hydrochloride*

270 mg. of D-dihydrolysergic acid are finely suspended in 5 cc. of phosphorus oxychloride and 208 mg. of phosphorus pentachloride are added while stirring. The reaction mixture is heated to 90° and kept at this temperature for 2 minutes. The phosphorus oxychloride is then evaporated in a water jet vacuum and the remaining colourless powder recrystallised twice from hexane. The hydrochloride of the D-dihydrolysergic acid chloride results, having a melting point of higher than 300°.

*Example 5.—1-Methyl-D-Lysergic Acid Chloride Hydrochloride*

564 mg. of 1-methyl-D-lysergic acid [melting point 239–240°, $[\alpha]_D^{20}=+116°$ (c.=0.5 in 0.1 N methanesulphonic acid)] are suspended in 8 cc. of petroleum ether containing 2 cc. of ether and a mixture of 10 cc. of petroleum ether containing 8 cc. of phosphorus oxychloride is added at −10 to −5°. 457 mg. of phosphorus pentachloride are then added at the same temperature and the mixture stirred for a further 2 hours. The reaction mixture is then diluted with 80 cc. of petroleum ether and the precipitated acid chloride filtered off as a grey powder, and dried in a vacuum of 11 mm. of Hg at 40°.

The 1-methyl-D-lysergic acid used as a starting material may be prepared as follows: 5 g. of 1-methyl-ergotamine [melting point 185°, $[\alpha]_D^{20}=-170°$ (c.=1 in chloroform)] are boiled at reflux for three and a half hours in a suspension of 12.5 g. of barium hydroxide crystals in 40 cc. of water/alcohol (1:1) in an atmosphere of nitrogen. The solution is cooled to room temperature, 5 cc. of concentrated ammonia solution added and the barium precipitated as barium sulphate by the addition of 40.5 cc. of 2 N sulphuric acid. The solution is then filtered, the filter cake washed 5 times each time with 40 cc. of 1 N ammonia solution in 50% alcohol and the clear solution evaporated in a vacuum. Upon evaporation the 1-methyl-D-lysergic acid crystallises from the solution in the form of fine yellowish crystals. Melting point 239–240°, $[\alpha]_D^{20}=+116°$ (c.=0.5 in 0.1 N methanesulphonic acid).

Having thus disclosed the invention, what is claimed is:
1. D-dihydrolysergic acid chloride hydrochloride.
2. 1-methyl-D-lysergic acid chloride hydrochloride.
3. D-dihydrolysergic acid halide hydrohalide.
4. 1-methyl-D-lysergic acid halide hydrohalide.
5. A compound of the formula

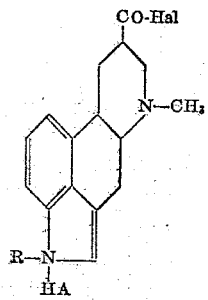

wherein R is a member selected from the group consisting of hydrogen and an alkyl from 1 to 4 carbon atoms, Hal is a member of the class consisting of chlorine, bromine and iodine and A is the anion of a strong inorganic acid.

6. A compound of the formula

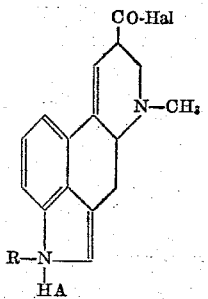

wherein R is an alkyl from 1 to 4 carbon atoms, Hal is a member selected from the group consisting of chlorine, bromine and iodine and A is the anion of a strong inorganic acid.

References Cited in the file of this patent
Garbrecht: J. Org. Chem., vol. 24, pp. 368–372 (1959).